(12) United States Patent
Davidson, Sr. et al.

(10) Patent No.: US 7,575,017 B2
(45) Date of Patent: Aug. 18, 2009

(54) WET BARREL FIRE HYDRANT SYSTEM WITH SECOND VALVE

(75) Inventors: Thomas Dewey Davidson, Sr., Griffin, GA (US); David Michael Walden, Sharpsburg, GA (US); Anthony Ferrari, McDonough, GA (US); David Phillips, Roswell, GA (US); O. G. Sims, Williamson, GA (US); Matthew Jesse Rose, Macon, GA (US)

(73) Assignee: Davidson Hydrant Technologies, Inc., Sunnyside, GA (US)

( * ) Notice: Subject to any disclaimer, the term of this patent is extended or adjusted under 35 U.S.C. 154(b) by 490 days.

(21) Appl. No.: 11/544,429

(22) Filed: Oct. 6, 2006

(65) Prior Publication Data
US 2008/0083458 A1 Apr. 10, 2008

(51) Int. Cl.
*F16K 15/18* (2006.01)
*F16K 11/00* (2006.01)

(52) U.S. Cl. .............. 137/299; 137/300; 137/614.2; 137/68.14; 137/272

(58) Field of Classification Search ............ 137/299, 137/300, 272, 614.2, 68.14
See application file for complete search history.

(56) References Cited

U.S. PATENT DOCUMENTS

| 154,087 | A | 8/1874 | Roberts |
| 726,369 | A | 4/1903 | Sullivan |
| 1,562,223 | A | 11/1925 | Gannestad |
| 1,601,993 | A | 10/1926 | Blake |
| 2,083,319 | A | 6/1937 | Daviet |
| 2,109,187 | A | 2/1938 | Vogel |
| 2,244,993 | A | 6/1941 | Hollifield |
| 2,515,770 | A | 7/1950 | Grönberg |
| 2,580,199 | A | 12/1951 | Schmid |
| 3,017,896 | A | 1/1962 | Papacek |
| 3,035,609 | A | 5/1962 | Dyer |
| 3,158,170 | A | 11/1964 | Tubbs |
| 3,294,109 | A | 12/1966 | Smith |
| 3,380,471 | A | * | 4/1968 | Mueller et al. ............... 137/299 |
| 3,475,978 | A | 11/1969 | Dunton |

(Continued)

FOREIGN PATENT DOCUMENTS

CH 191132 3/1937

(Continued)

OTHER PUBLICATIONS

International Search Report and Written Opinion issued by the European Patent Office for PCT/US2007/063068 mailed Nov. 21, 2007.

(Continued)

*Primary Examiner*—Kevin L Lee
(74) *Attorney, Agent, or Firm*—Kilpatrick Stockton LLP

(57) ABSTRACT

Wet barrel fire hydrants which feature additional structure for reducing the potential that those with ill intent can foul municipal water supplies by introducing toxins or other materials into fire hydrants. Various embodiments include valves which close off portions of the hydrant or water conduit otherwise available for receipt of toxic or other materials when the fire hydrant nozzle cap is unscrewed and open and/or a pump is connected to the nozzle. Such valves preferably open automatically when water is flowing from the water supply through the nozzle, but close off portions of the barrel when the nozzle is open and water is not flowing through the nozzle.

27 Claims, 10 Drawing Sheets

U.S. PATENT DOCUMENTS

| | | |
|---|---|---|
| 3,566,905 A | 3/1971 | Noland |
| 3,586,019 A | 6/1971 | Thomas et al. |
| 3,770,000 A | 11/1973 | Murdock et al. |
| 3,939,861 A | 2/1976 | Thompson |
| 3,952,770 A | 4/1976 | Botnick |
| 3,980,097 A | 9/1976 | Ellis |
| 4,022,421 A | 5/1977 | Carlin |
| 4,139,931 A | 2/1979 | Royce |
| 4,393,891 A | 7/1983 | Snoek et al. |
| 4,440,190 A | 4/1984 | Barbe |
| 4,475,570 A | 10/1984 | Pike et al. |
| 4,602,654 A | 7/1986 | Stehling et al. |
| 4,791,952 A | 12/1988 | Laurel |
| 4,813,378 A | 3/1989 | Lapp |
| 4,909,270 A | 3/1990 | Enterante, Sr. et al. |
| 5,029,603 A | 7/1991 | Ackroyd |
| 5,129,416 A | 7/1992 | Ackroyd |
| 5,549,133 A | 8/1996 | Sigelakis |
| 5,609,179 A | 3/1997 | Knapp |
| 5,622,202 A | 4/1997 | Etter et al. |
| 6,401,745 B1 | 6/2002 | Corder |
| 6,488,048 B2 | 12/2002 | Kuhmayer et al. |
| 6,769,446 B1 | 8/2004 | Ball et al. |
| 6,868,860 B2 | 3/2005 | Davidson |
| 6,910,495 B2 | 6/2005 | Lafalce |
| 7,055,544 B2 | 6/2006 | Davidson |
| 7,128,083 B2 | 10/2006 | Fleury, Jr. et al. |
| 7,174,911 B2 | 2/2007 | Davidson |
| 7,240,688 B2 | 7/2007 | Davidson et al. |
| 7,428,910 B2 | 9/2008 | Davidson et al. |
| 2004/0154659 A1 | 8/2004 | Lafalce |
| 2005/0067016 A1 | 3/2005 | Wigzell |
| 2006/0108002 A1 | 5/2006 | Davidson |
| 2006/0201551 A1 | 9/2006 | Davidson et al. |
| 2006/0207657 A1 | 9/2006 | Davidson et al. |
| 2007/0157972 A1 | 7/2007 | Hendey |
| 2007/0272300 A1 | 11/2007 | Davidson et al. |
| 2008/0023072 A1 | 1/2008 | Fleury, Jr. et al. |
| 2008/0135100 A1 | 6/2008 | Davidson et al. |

FOREIGN PATENT DOCUMENTS

| | | |
|---|---|---|
| CH | 675139 A | 8/1990 |
| DE | 229997 C | 1/1911 |
| DE | 236 645 | 11/1911 |
| DE | 639655 C | 12/1936 |
| DE | 2237019 | 2/1973 |
| DE | 25159 | 12/1983 |
| DE | 19803901 | 5/1999 |
| EP | 0 113 913 A1 | 7/1984 |
| EP | 0 463 702 A1 | 1/1992 |
| EP | 1 010 821 A1 | 6/2000 |
| EP | 1010822 | 6/2000 |
| FR | 735506 | 11/1932 |
| FR | 2773373 | 7/1999 |
| WO | WO-2004051009 A1 | 6/2004 |
| WO | WO-2004072388 A2 | 8/2004 |
| WO | WO-2007146083 A2 | 12/2007 |
| WO | WO-2008045785 A1 | 4/2008 |
| WO | WO-2008124750 | 10/2008 |

OTHER PUBLICATIONS

International Search Report and Written Opinion issued by the European Patent Office for PCT/US2007/080572 mailed Feb. 18, 2008.

International Search Report, May 4, 2004, issued by European Patent Office for PCT US03/37681.

International Preliminary Examination Report, Jan. 17, 2005, issued by European Patent Office for PCT US03/37681.

PCT/US2007/063064 International Search Report and Written Opinion mailed Jul. 10, 2007.

PCT/US2007/063068 Invitation to Pay and Partial International Search Report mailed Aug. 2, 2007.

Mexican Patent Application No. PA/a/2005/006002 English Translations of Official Action dated Sep. 13, 2007.

PCT/US08/59715 International Search Report and Written Opinion dated Sep. 11, 2008.

PCT/US08/73181 International Search Report and Written Opinion dated Nov. 5, 1008.

* cited by examiner

WET BARREL FIRE HYDRANT SYSTEM WITH SECOND VALVE

RELATED FIELDS

Various aspects and embodiments of the present invention relate to wet barrel fire hydrant systems which include additional valving in order to render more difficult the task of introducing toxins into a water supply.

BACKGROUND

Conventional wet barrel fire hydrant systems offer access to a municipal water supply in a manner in which operatives with ill intent may appreciate. Wet barrel fire hydrant system generally include a wet barrel fire hydrant and a water conduit that connects the hydrant to a water main. Briefly, conventional wet barrel fire hydrants include at least one nozzle for coupling to a fire hose. The nozzle is closed off by a threaded cap when the hydrant is not in use. The hydrant also includes a hydrant valve which controls flow of water from the water supply to and through the nozzle, and into the fire hose. The hydrant valve is opened and closed using an actuator nut on the outside of the hydrant that may be essentially opposite the nozzle.

Conventionally, the nozzle of the hydrant can accommodate at least some fluid. Accordingly, it is possible to unscrew a nozzle cap, introduce a toxin, reattach the nozzle cap and open the hydrant valve to allow the toxins to communicate with and flow by gravity and perhaps at least to some extent by Bernoulli's principle, into the municipal water supply, since when the nozzle cap is attached and/or when the hydrant valve is closed, water pressure from the water supply would not force the toxins back out of the hydrant.

Toxins may also be introduced into the fire hydrant barrel and the water supply using a pump. For example, the nozzle cap can be removed and a hose attached to the nozzle. The nozzle valve can be opened and a pump attached to the hose can pump toxin into the hydrant. The pump may operate at sufficient pressure to overcome the water pressure of the fire hydrant system (for example, 60 to 120 PSI) and contaminate the water supply.

SUMMARY

One or more of various structures and embodiments according to the present invention may be introduced between the nozzle and the municipal water supply in order to make it more difficult or impossible to introduce toxins to a water supply through a wet fire hydrant. Structures such as valves according to various embodiments of the present invention permit the flow of water from the water supply to the nozzle, but prevent or substantially prevent the flow of water, or other liquid, gas, or solid, from the nozzle to the water supply.

Valves or other structure according to various embodiments of the present invention may be introduced in the hydrant barrel, in a water conduit, or otherwise. They may form at least two general types:

(1) Valves which operate logically as an "and" gate to open only when both the hydrant valve and at least one nozzle is open but to be closed at all other times; and (2) Check valves that open when liquid or gas flows in one direction and close when liquid or gas flows in a second direction.

Preferably, valves according to various embodiments of the present invention are located between a hydrant upper barrel and a water main that may be located below ground.

It is accordingly an object of various embodiments of the present invention to provide additional structure for wet barrel fire hydrant systems in order to reduce the possibility of toxins being introduced into a water supply.

It is an additional object of various embodiments of the present invention to provide structures for retrofitting into wet barrel fire hydrant systems in order to reduce the possibility of toxins being introduced into a water supply.

It is an additional object of various embodiments of the present invention to provide structure interposed between nozzles of wet barrel fire hydrants and a water source, such a municipality water line, through which water actually flows out of the hydrant when at least one nozzle and the hydrant valve is open.

Other objects, features, and advantages of various embodiments of the present invention will become apparent with respect to the remainder of this document.

BRIEF DESCRIPTION

DETAILED DESCRIPTION

Figure 1:
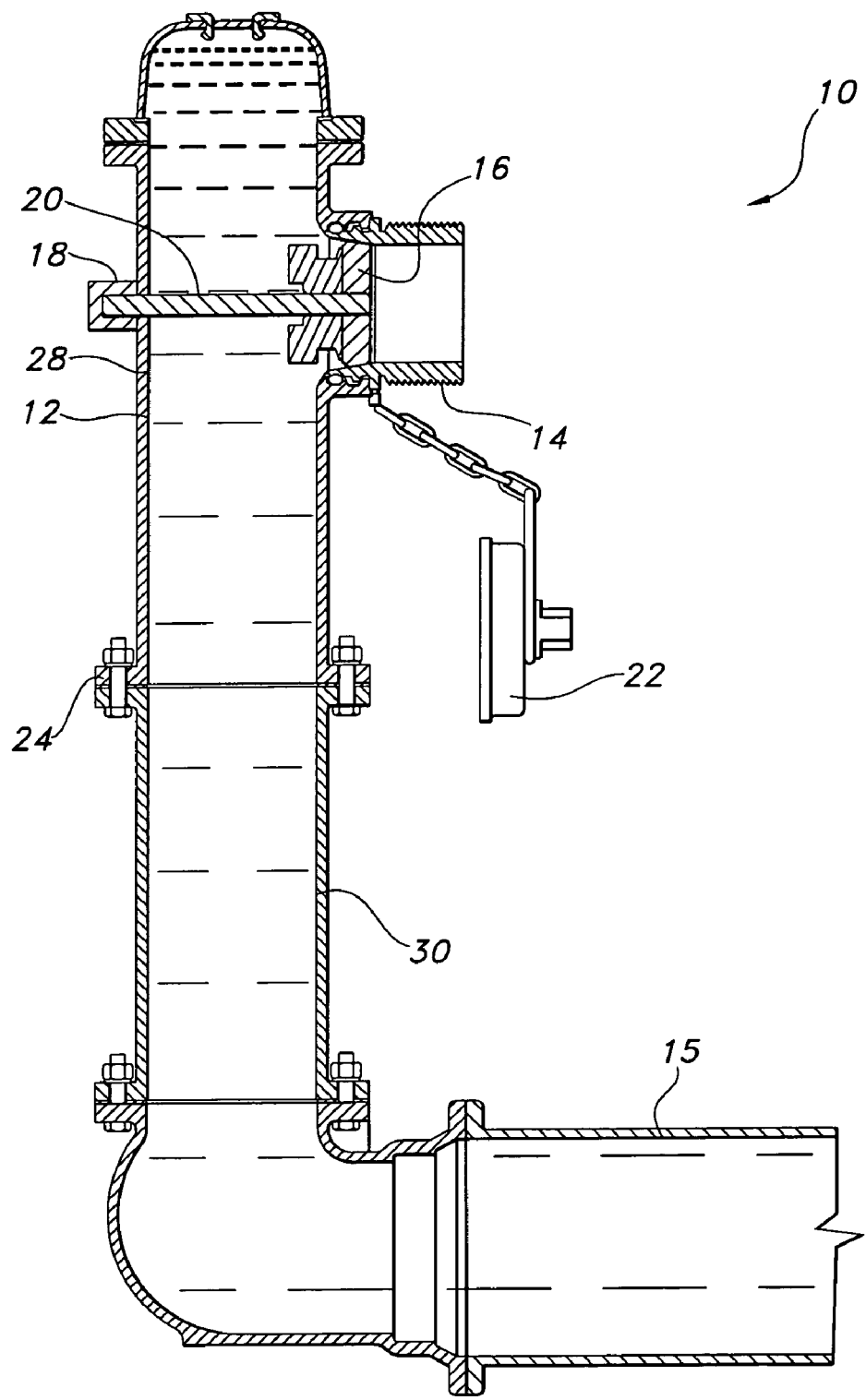
FIG. 1 shows a cross section of one version of a conventional wet fire hydrant with nozzle cap removed and hydrant valve closed.

FIG. 1 shows a conventional wet fire hydrant 10. Hydrant 10 typically includes a substantially vertical barrel 12 and at least one nozzle 14 through which water may flow from a water conduit 15 and/or water main (not shown) to a fire hose given certain circumstances as discussed generally below. At the nozzle 14 of the barrel 12 is a hydrant valve 16 which controllably interrupts fluid flow between the barrel 12 and the nozzle 14. Opposite the nozzle 14 may be found an operating nut 18 that includes threads which receive threads on an actuator rod 20 which in turn connects to the hydrant valve 16. In some hydrants, the operating nut 18 and/or nozzle 14 may be closed off by a cap structure. Operating nut 18 may be used by fire fighters or others to open the hydrant valve 16 via actuator rod 20. Hydrant 10 can include more nozzles 14. In some hydrants, each nozzle 14 may be closed with a cap such as a threaded cap 22. The hydrant may also include breakaway structure such as a traffic feature 24.

In normal operation, the hydrant 10 may be employed as follows to help fight fires, provide refreshing summer breaks for overheated urban citizens and/or their offspring, participants in road races, or for other purposes or beneficiaries. First, a hose (not shown) may be connected to nozzle 14, usually in a threaded fashion after the cap 22 has been removed (See, e.g., FIG. 1). Then, after the hose is connected, operating nut 18 may be rotated with a wrench to cause actuator rod 20 to pull on relevant portions of hydrant valve 16 in order to open hydrant valve 16 (See, e.g., FIG. 4). When valve 16 opens, water flows from the barrel 12 water flows past hydrant valve 16 and out nozzle 14 into the hose and accordingly toward its desired application or destination.

Figure 2:
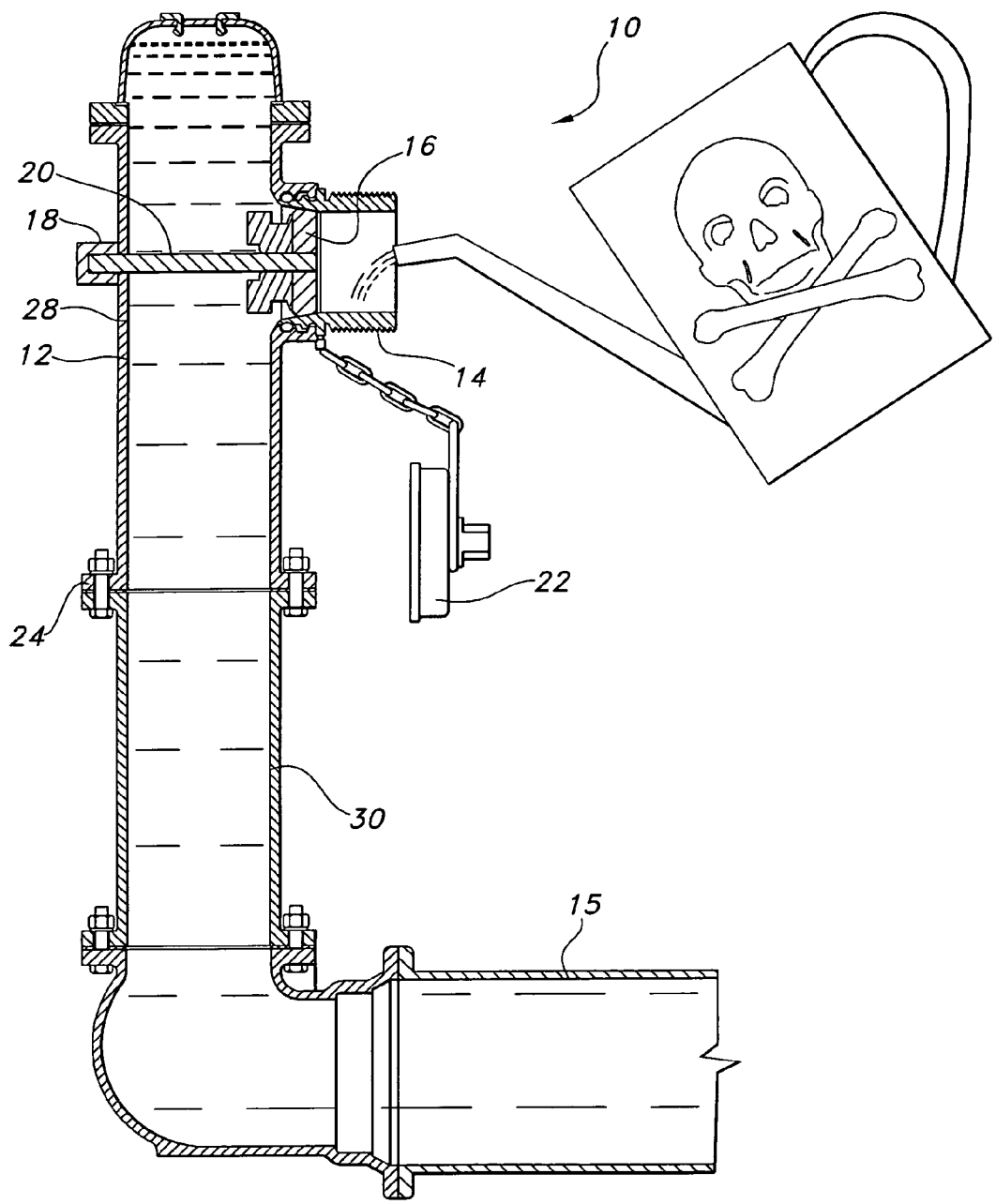
FIG. 2 shows toxins being introduced into the nozzle of the wet hydrant of FIG. 1.
Figure 3:
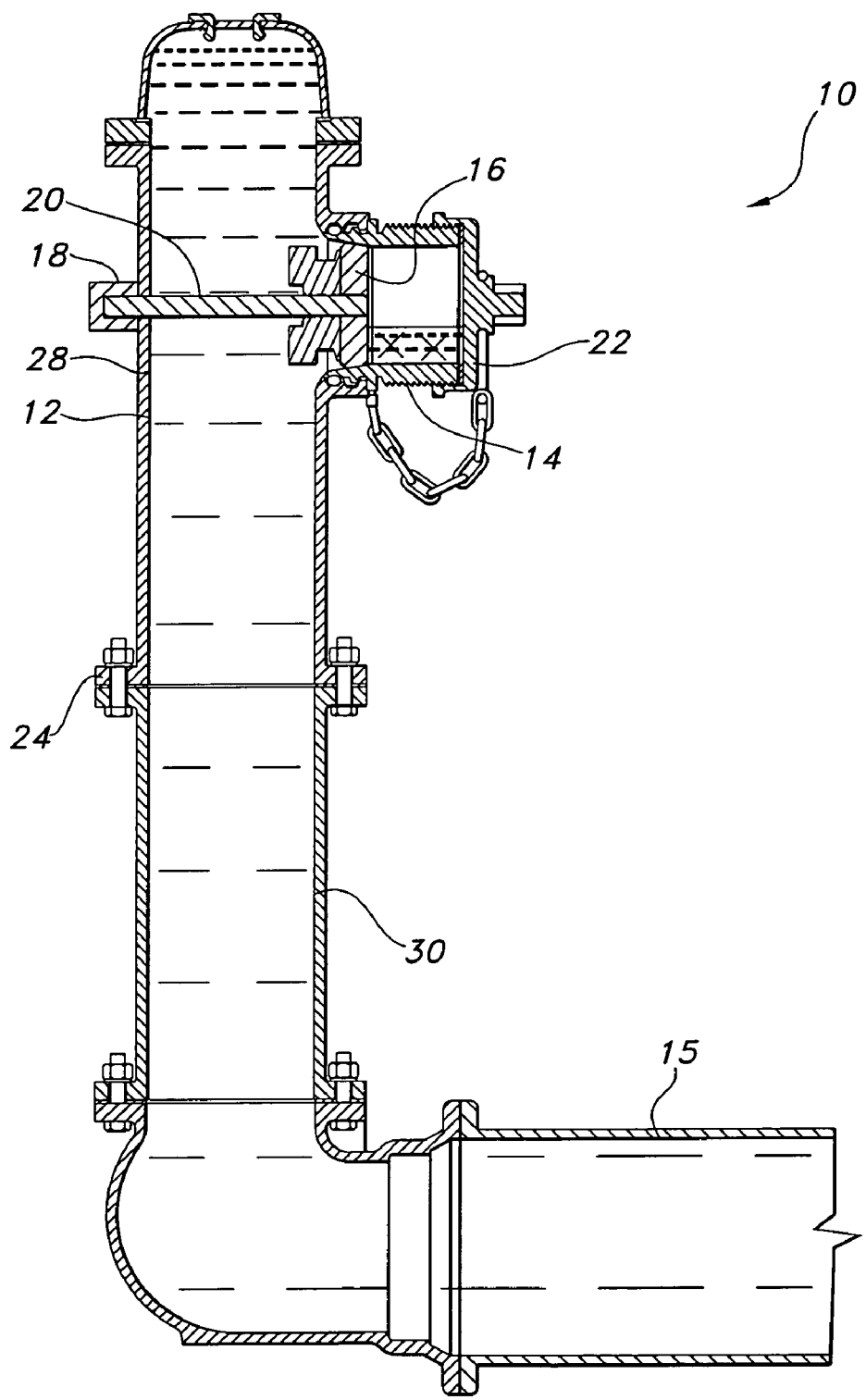
FIG. 3 shows the cap replaced on the nozzle of the wet hydrant of FIG. 1 after toxins have been introduced.
Figure 4:
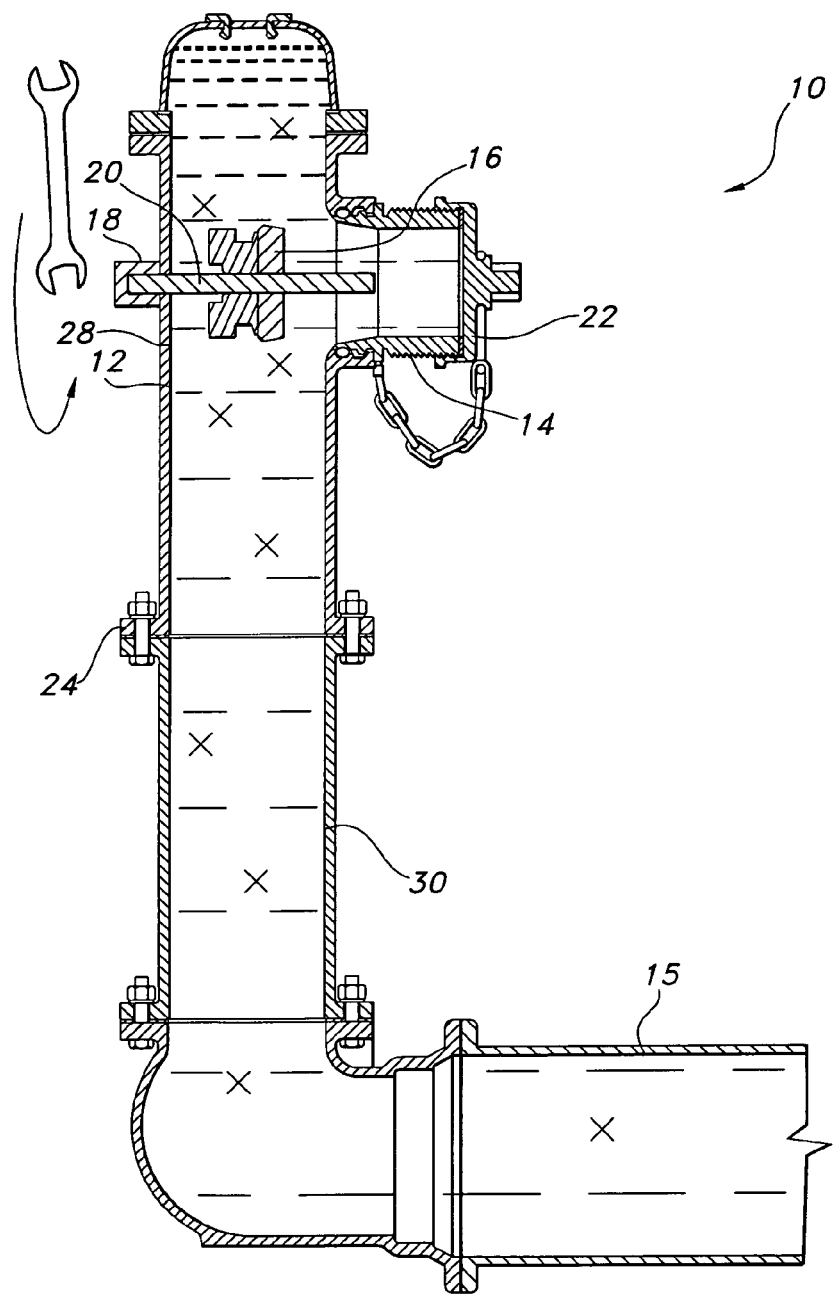
FIG. 4 shows opening of the hydrant valve of the hydrant of FIG. 1 after toxins have been introduced and the nozzle closed.
Figure 5:
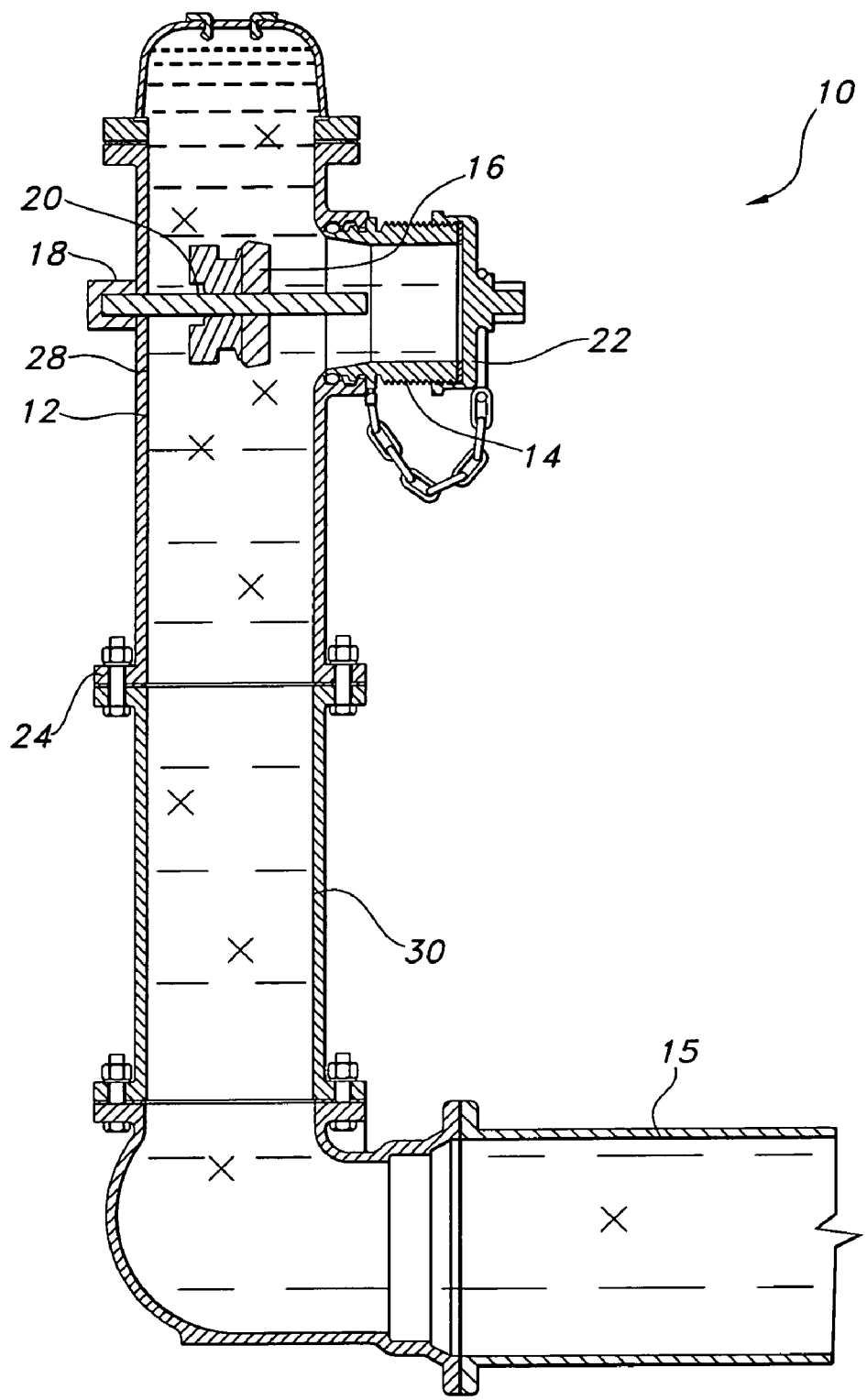
FIG. 5 shows toxins being introduced into a water supply as a result of the sequence shown in FIGS. 1-4.

However, hydrant 10 may also be the subject of attention from miscreants who have the temerity to attempt to introduce toxins into a public water supply. Such concerns have heightened since the date known as "9-11" (Sep. 11, 2001) when terrorists activities became the focus of heightened concern. Accordingly, the need for structures according to various embodiments of the present invention became more apparent after that bellweather event, even if they were foreseen by the inventor named in this document beforehand. More particularly, a person with ill design can attempt to introduce toxins into a water supply taking advantage of the fact that the nozzle 14 can accommodate toxins. Accordingly, as shown in FIGS. 1-4, a malefactor can unscrew cap 22 as shown in FIG. 1, introduce toxins as shown in FIG. 2, screw the cap back on as shown in FIG. 3, and open the hydrant valve 16 as shown in FIG. 4. When the nozzle 14 or all nozzles 14 are closed off and the valve 16 opened, the toxins in the nozzle 14 can communicate with liquid in the water supply in order to foul the water supply to the potential detriment of all those whose facilities are in communication with such water supply.

Figure 6:
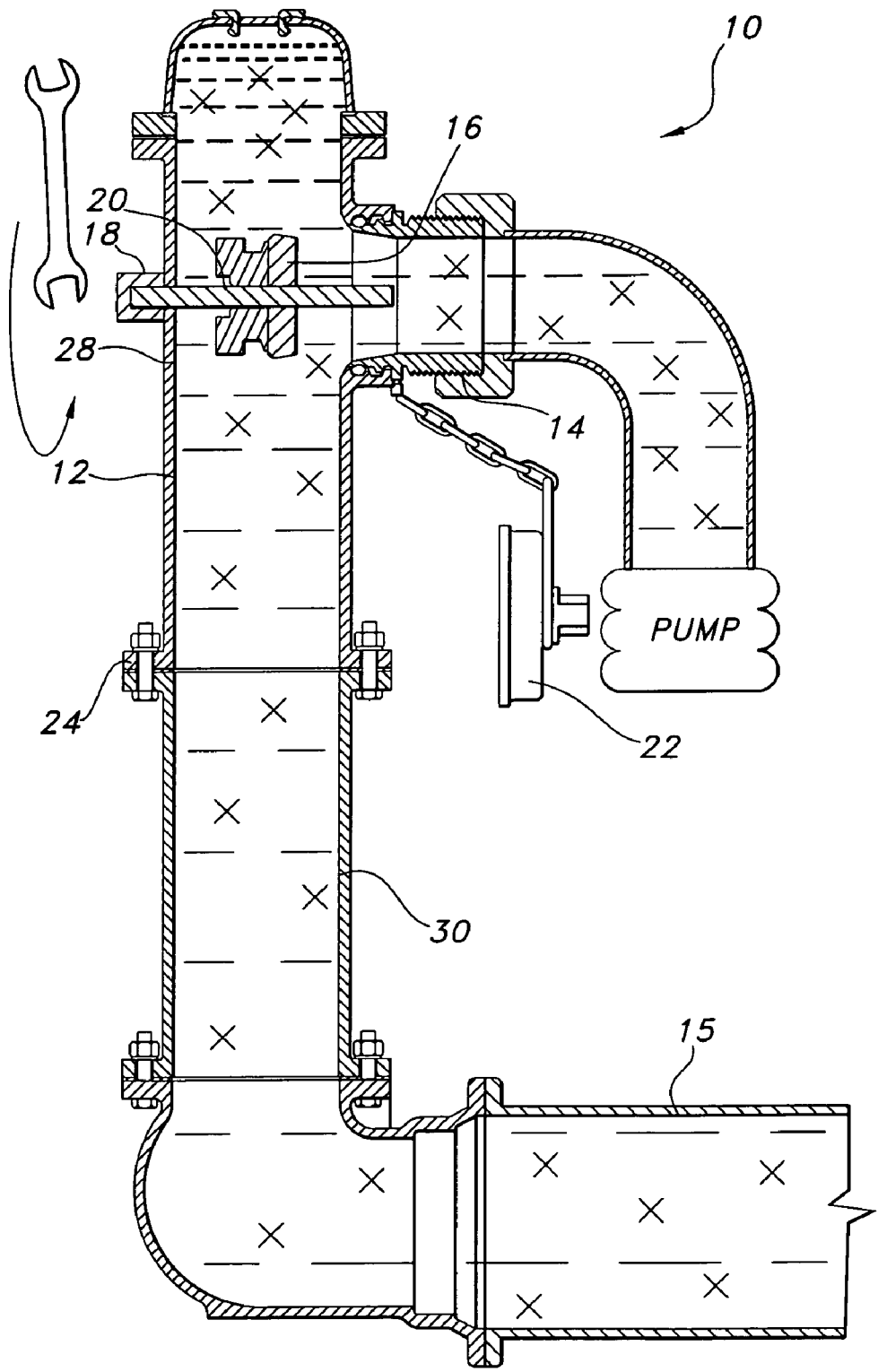
FIG. 6 shows toxins being introduced into a water supply through a wet barrel fire hydrant using a pump and hose.

Moreover, a hose with a pump may be connected, as shown in FIG. 6, to the nozzle 14 in order to introduce toxins in the barrel 12 and water supply. For example, the nozzle cap 22 may be removed from the nozzle 14 and a hose having a threaded end may be connected to the nozzle 14. The valve 16 may be opened to allow the water in the barrel 12 to communicate with the hose. The hose may contain toxins and a pump capable of producing sufficient pressure to overcome the pressure of the water in the barrel 12. The pump may pump toxins into the barrel 12 and water main through water conduit 15, thereby contaminating the water supply.

Some wet barrel fire hydrant systems include a cut off valve located close to or at the water main and/or in the water conduit between the hydrant and the water main. A malefactor may cut off the flow of water to the wet hydrant, remove the nozzle cap and open the hydrant valve to let at least some of the water in the wet hydrant to escape, and introduce toxins into the wet hydrant. The malefactor may close the hydrant valve and release the cut off valve to allow water to flow between the water main and wet hydrant, thereby allowing the toxins to mix with the water supply.

Various structures according to various embodiments of the present invention prevent or reduce the possibility of such unworthy and direct reprobatory activity. Generally, various structures according to various embodiments of the present invention introduce physical structure between nozzle 14 and the water main (not shown) through which water flows only when a nozzle 14 and hydrant valve 16 are open. Alternatively or in combination, such structure may close off portions of the wet barrel fire hydrant system between the nozzle 14 and a water main (not shown) in order to deprive miscreants of introducing toxins into an upper portion of the barrel 28, generally defined as the area of the barrel 12 above the breakaway structure or traffic feature 24, and allowing the toxins to flow through a lower portion of the barrel 30, generally defined as the area of the barrel below the breakaway structure or traffic feature, and through the water conduit 15 to the water main (not shown).

Figure 7:
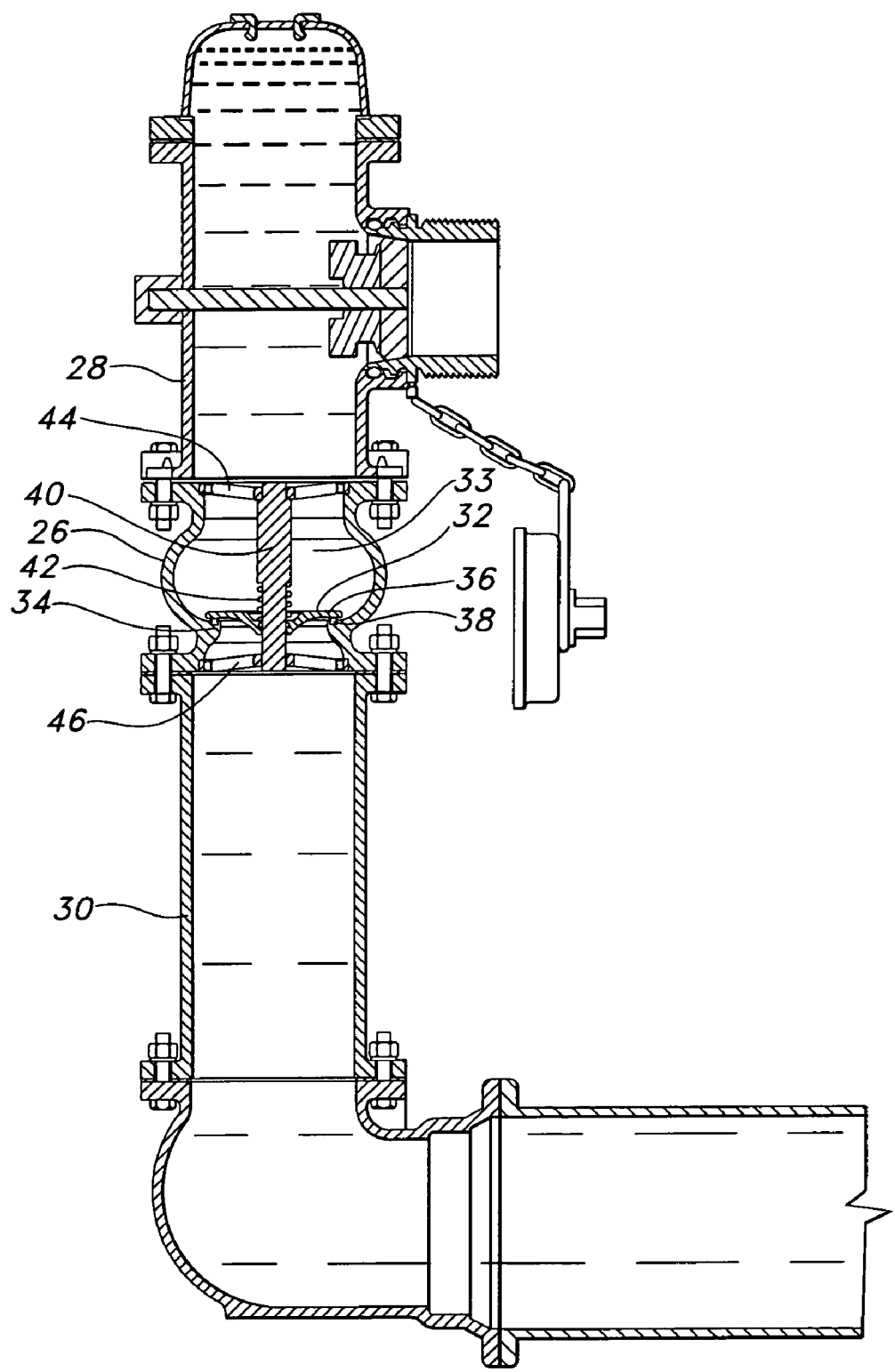
FIG. 7 shows the wet hydrant of FIG. 1, which can be any conventional wet hydrant, which includes one embodiment of a second valve according to one embodiment of the present invention.
Figure 8:
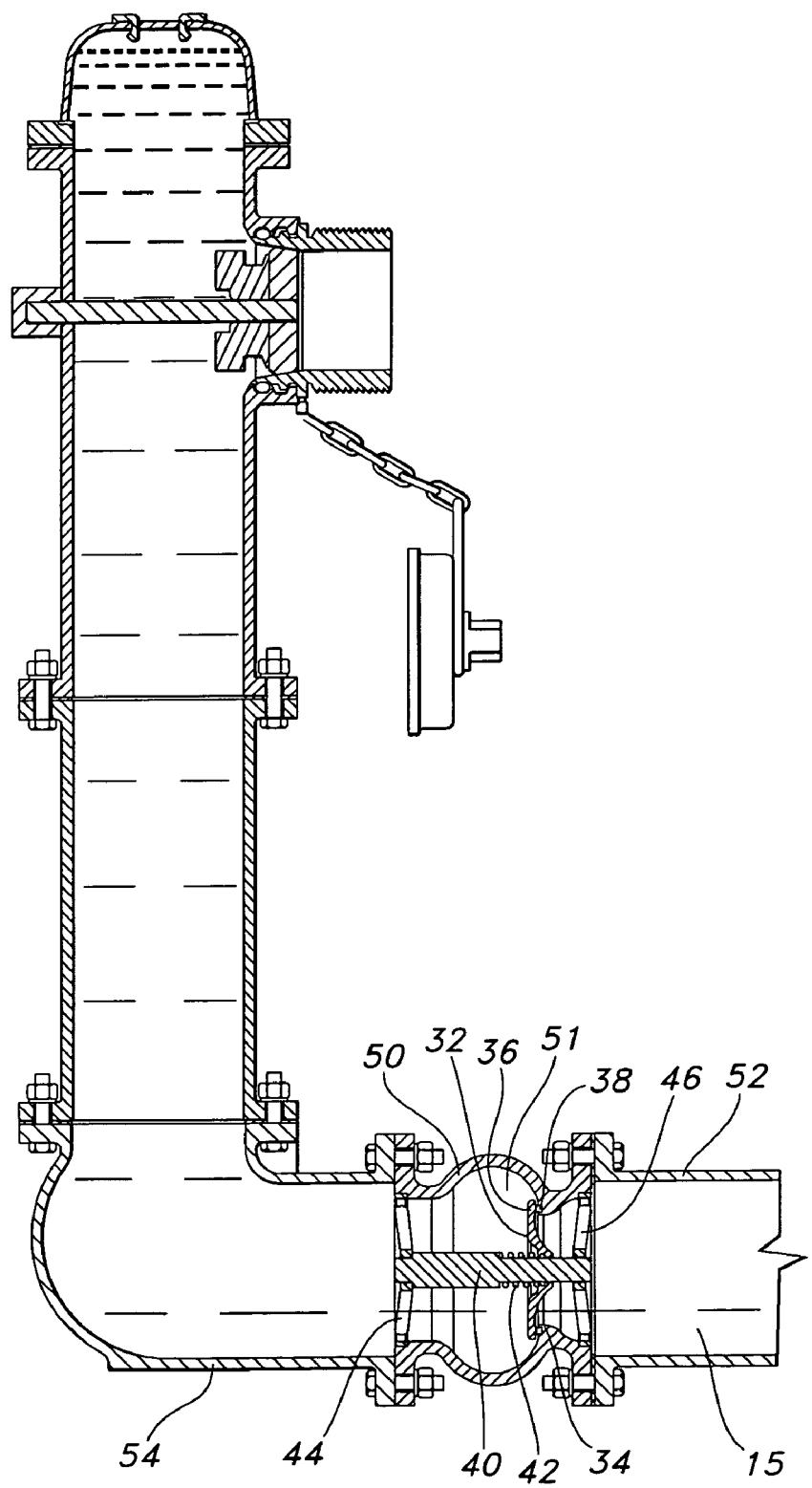
FIG. 8 shows the wet hydrant of FIG. 1 with a second valve located in a water conduit according to one embodiment of the present invention.
Figure 9:
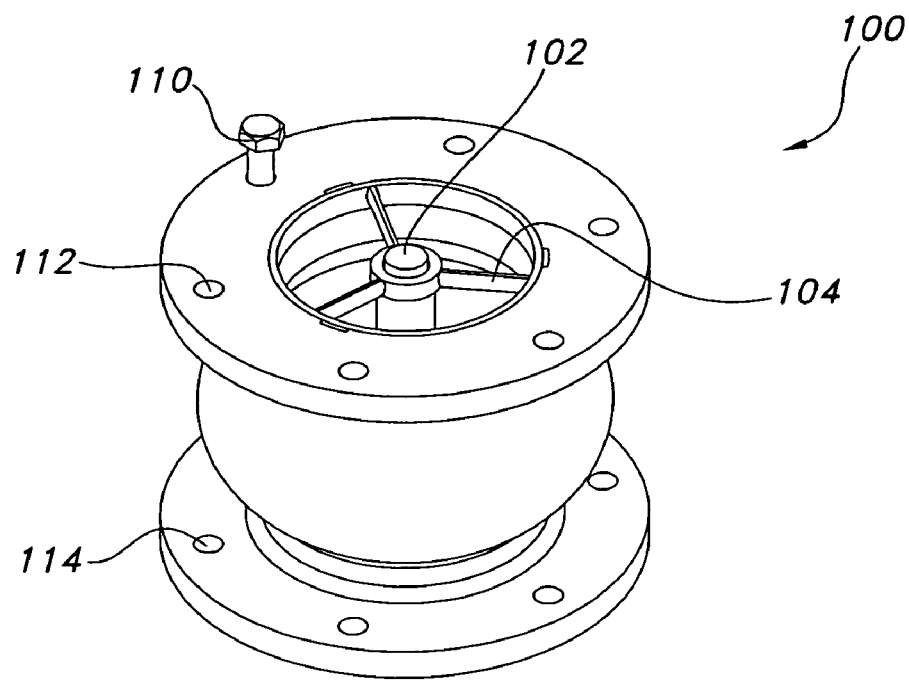
FIG. 9 shows a perspective view of a globe containing a second valve according to one embodiment of the present invention.

According to a first embodiment shown in FIGS. 7-9, a second valve 32 according to the present invention operates in logical fashion as an "and" gate, the logical operands being at least partial openness of both the nozzle 14 and the hydrant valve 16 or otherwise.

In the embodiment shown in FIGS. 7 and 8, second valve 32 includes a seat 34 which may be a portion of a globe 26 or, as shown in FIG. 8, a water conduit globe 50 in the water conduit 15. The seat 34 may be any structure that preferably but not necessarily allows valve 32 to be retrofitted to the hydrant 10 or water conduit 15. Valve 32 may also include a restriction member 36 and an "O" ring 38 located in the inner portion 33 of the globe 26 or the inner portion 51 of water conduit globe 50, to assist in forming a seal between the restriction member 36 and the seat 34. The restriction member 36 may be, slidably or otherwise, connected to a stem 40 and a spring 42. The stem 40 can include a larger diameter portion at least near the middle of the globe 26 or water conduit globe 50 to limit the movement of the restriction member 36. One or more connection members 44, 46 may be used to position the restriction member 36 in the globe 26 or water conduit globe 50. The globe 26 can connect to the barrel 12, such as by removing a portion of the barrel and attaching the globe 26 to the barrel using flanges. The water conduit globe 50 can connect to the water conduit 15, such as by removing a portion of the water conduit 15 and attaching the water conduit globe 50 to the water conduit 15 using flanges.

The spring 42 and stem 40 can introduce a force on the restriction member 36 in order to form a seal with the seat 34 to prevent or substantially prevent the flow of water, toxins, or other liquids or solids from upper barrel 28 to the lower barrel 30 or, as shown in FIG. 8, from the fire hydrant to the water main. For instance in FIG. 7, the spring 42 may bias the restriction member 36 unless water or other liquid flows from lower hydrant portion 30 to the upper hydrant portion 28. If water or other liquid flows from the lower hydrant portion 30 to the upper hydrant portion 28, the water can force the restriction member 36 to open, such as by forcing the restriction member upwards and compressing the spring 42 against the one or more connection members 44, 46. When water or fluid is not flowing or flowing from the upper barrel 28 to the lower barrel 30, the spring 42 biases the restriction member 36 to prevent fluid in the upper barrel 28 from flowing to the lower barrel 30.

In FIG. 8, the spring 42 may bias the restriction member 36 unless water or other liquid flows from the water conduit first portion 52 to the water conduit second portion 54. In some embodiments, the water conduit first portion 52 may be between the water main (not shown) and the water conduit globe 50 and the water conduit second portion 54 may be between the water conduit globe 50 and the hydrant 10. If water or other liquid flows from water conduit first portion 52 to water conduit second portion 54, the water can force the restriction member 36 to open, such as by forcing the restriction member towards the water conduit second portion and compressing the spring 42 against the one or more connection members 44, 46. When water or fluid is not flowing or flowing from the water conduit second portion 54 to the water conduit first portion 52, the spring 42 biases the restriction member 36 to prevent fluid in the water conduit second portion 54 from flowing to the water conduit first portion 52.

Restriction member 36 may be disc shaped to correspond generally to the inside surfaces of the globe 26 and/or water conduit globe 50, and it may include a collar to receive portions of stem 40 in sliding fashion or otherwise being connected to or mounted to stem 40.

When nozzle cap 22 is removed and toxins inserted into the nozzle or the cut off valve is used to cut off water, toxins inserted into the barrel, and the hydrant valve 16 is opened, the restriction member 36 prevents or substantially prevents toxins or other liquid, solids or materials from being poured into the barrel 12 and mix with the water supply. A reprobate, miscreant, villain or other unworthy type with ill will cannot push down on or puncture restriction member 36 to open up the barrel 12 according to restriction members 36 formed according to preferred embodiments of the invention which provide suitable resistance to deformation or destruction such as by screwdrivers, crow bars, or other implements employed on occasion by those with ill design or for other purposes. Such malefactory activity is prevented because the restriction member 36 closes off the barrel 12 or water conduit 15 in all cases except where water is flowing from the water main and/or through the barrel 12.

Flanges may facilitate retrofitting globe 26 or water conduit globe 50 into hydrant 10 or water conduit 15. In some embodiments, flanges may be chosen from a variety of split flanges such that the globe 26 or water conduit globe 50 may be used with various fire hydrants having various flange configurations.

A logical table for operation of second valve 32 as shown in FIG. 7-9 is shown in Table 1 may be as follows, where "O" means "open" and "C" means closed:

TABLE 1

| Hydrant Valve | O | C | O | C |
|---|---|---|---|---|
| Nozzle | O | C | C | O |
| Second Valve | O | C | C | C |
| Flow from water main through barrel and/or water conduit | Y | N | N | N |
| Flow from hydrant to water supply | N | N | N | N |

Any desired physical structure may be employed to accomplish the objective of meeting logical Table 1 in order to produce or preclude introduction of undesired materials into fire hydrants. Components of embodiments according to the present invention are preferably durable materials but may be of any desired material. It is conventional for many components of fire hydrants to be bronze, and at least some or all of metallic components of structures according to various embodiments of the present invention may be formed of bronze or other conventional or even unconventional materials. For example, in some embodiments, at least some of the components, such as the restriction member and/or the seat, may be formed from iron and dipped in a liquid material, such as rubber or plastic, to coat the components. Alternatively, in some embodiments, iron components may be encapsulated in SBR rubber. Such processes may protect the iron components from corrosion or other types of decay. Such processes may also facilitate the seal between the restriction member and the seat, potentially obviating the need for a separate gasket. In some embodiments of the present invention, the restriction member, stem, and connection members may be made from plastic.

O-rings may be formed of conventional materials used in fire hydrants, or unconventional materials. Springs may be any suitable resilient structures formed of any desired material having requisite modulus of elasticity, durability, costs, and other properties.

Figure 10:
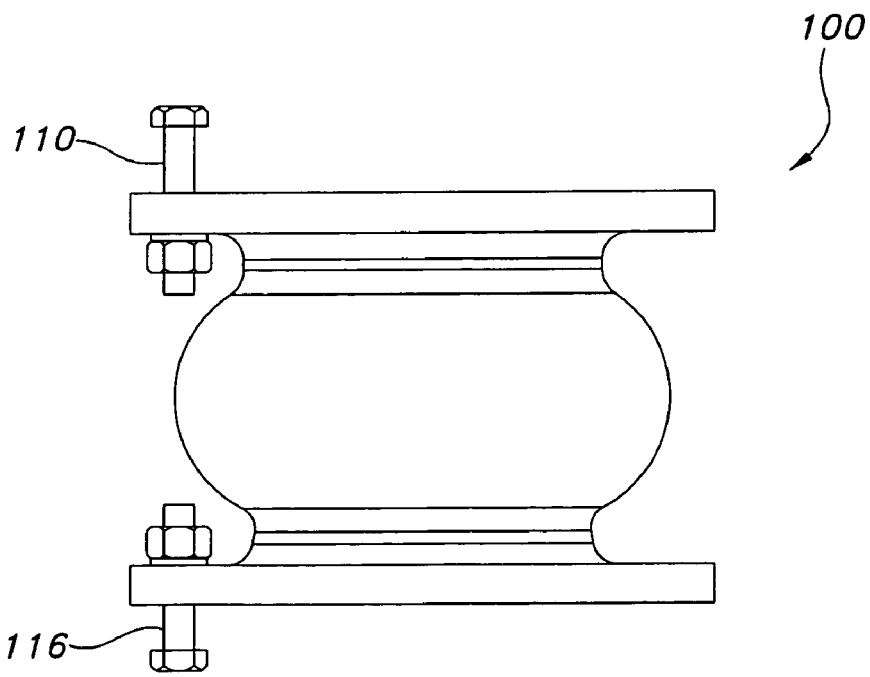
FIG. 10 shows a side view of the globe of FIG. 9.
Figure 11:
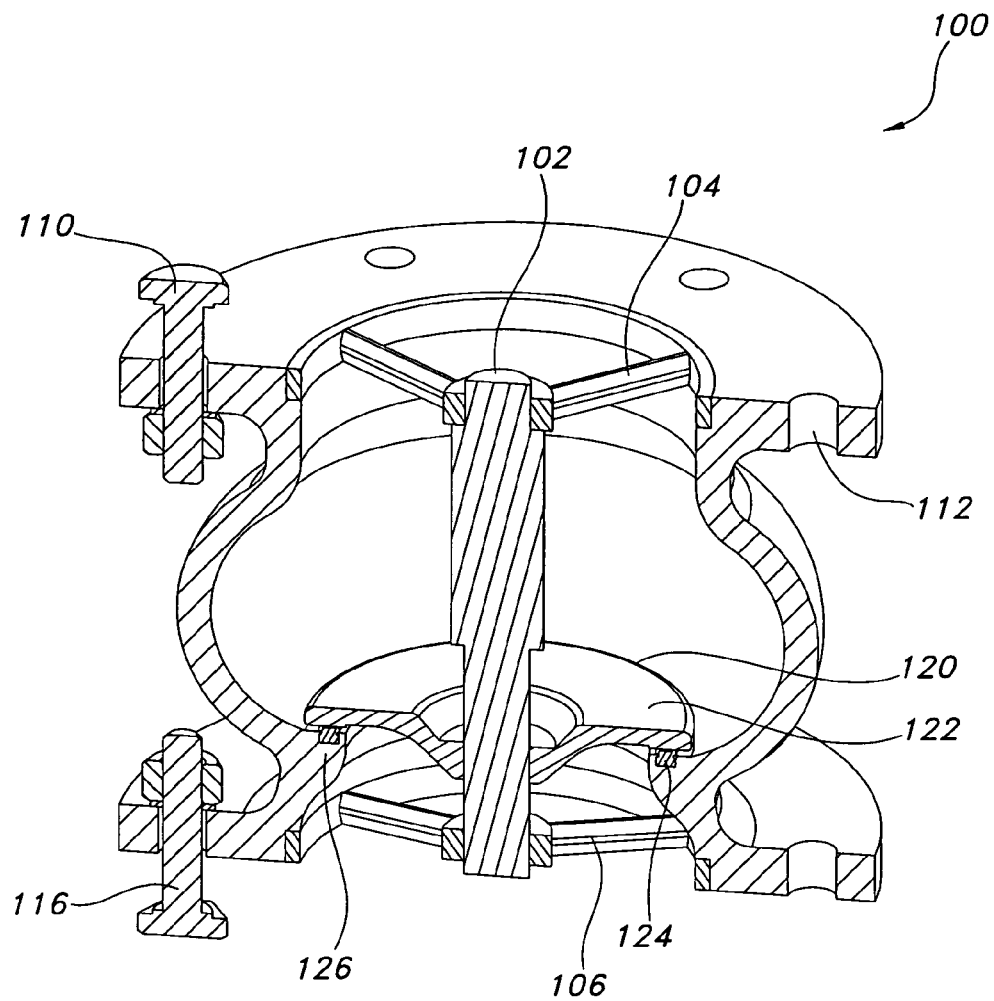
FIG. 11 shows a cut-away view of the globe of FIG. 9.

FIGS. 9-11 show one embodiment of a globe 100 that can house a second valve 120 and integrate or connect with a hydrant or water conduit. The second valve 120 can include a restriction member 122 and an "O" ring 124. The "O" ring 124 and restriction member 122 may form a seal with a seat 126 formed by the globe 100. The globe 100 can include a valve stem 102 that connects to the globe 100 by connection members 104, 106. The connection members 104, 106 can keep the stem 102 in a desired position relative to the globe 100 by connecting the stem 102 at one or both ends of the globe 100. The globe 100 may include flanges to connect with the barrel or water conduit with bolts 110, 116 through openings 112, 114. For example, one or more of the openings 112, 114 may align with openings on flanges connected to, or part of, the barrel or water conduit. One or more bolts 110, 112, or other structures, can connect the globe 100 to barrel or water conduit flanges.

Modifications, adaptations, changes, deletions, and additions may be made to various embodiments of the present invention as disclosed in this document without departing from the scope or spirit of the invention.

What is claimed:

1. A wet barrel fire hydrant system, comprising:
   a water conduit adapted to allow water to flow through the water conduit;
   a barrel adapted to communicate at least indirectly with the water conduit, the barrel comprising a breakaway structure;
   a nozzle extending from the barrel and communicating with the barrel;
   a hydrant valve adapted to controllably restrict communication between the nozzle and the barrel;
   a valve actuator adapted to allow actuation of the hydrant valve, said actuator comprising an actuator rod; and
   a globe comprising a second valve, the second valve comprising:
   a stem comprising an enlarged diameter portion having a diameter at least larger than other portions of the stem;
   a spring; and
   a restriction member adapted to cooperate with the stem, spring and a seat to substantially prevent liquids from flowing in a first direction and allow liquids to flow in a second direction.

2. The wet barrel fire hydrant system of claim 1, wherein the seat is a lower portion of the globe.

3. The wet barrel fire hydrant system of claim 1, wherein the seat is connected to the barrel.

4. The wet barrel fire hydrant system of claim 1, wherein the restriction member is substantially disc shaped.

5. The wet barrel fire hydrant system of claim 1, wherein the spring is adapted to push downward on the restriction member.

6. The wet barrel fire hydrant system of claim 1, wherein the stem enlarged diameter portion limits the movement of the restriction member.

7. The wet barrel fire hydrant system of claim 1, wherein the second valve further comprises a connection member for connecting the stem to the globe.

8. The wet barrel fire hydrant system of claim 1, wherein the globe is adapted to be retrofitted into the fire hydrant.

9. The wet barrel fire hydrant system of claim 1, wherein the breakaway structure comprises a traffic feature.

10. The wet barrel fire hydrant system of claim 1, wherein the second valve is at least partially located within the water conduit.

11. The wet barrel fire hydrant system of claim 1, wherein the water conduit comprises the globe and the second valve is at least partially located within the globe.

12. The wet barrel fire hydrant system of claim 1, wherein the second valve further comprises an "O" ring interposed between the seat and the restriction member.

13. The wet barrel fire hydrant system of claim 1,
wherein the barrel further comprises an upper barrel portion at or above the breakaway structure and a lower barrel portion at or below the breakaway structure; and
wherein the globe is located between the upper and lower barrel portions.

14. A wet barrel fire hydrant, comprising:
a. a water conduit adapted to allow water to flow through the water conduit from a water main;
b. a barrel adapted to communicate with a water conduit, the barrel comprising a breakaway structure and a globe;
c. a nozzle extending from the barrel and communicating with the barrel;
d. a hydrant valve adapted to controllably restrict communication between the barrel and the nozzle;
e. a valve actuator adapted to allow actuation of the hydrant valve, said actuator comprising an actuator rod;
f. an operating nut in communication with the actuator rod and located on substantially opposite the nozzle for opening and closing the hydrant valve; and
g. a second valve located in the globe and adapted to be closed when the hydrant valve is closed, but to permit flow of water from the water main to the nozzle when the hydrant valve is at least partially open and the nozzle is at least partially open.

15. The wet barrel fire hydrant of claim 14, wherein the breakaway structure comprises a traffic feature.

16. The wet barrel fire hydrant of claim 14 in which the second valve is adapted to be closed when the hydrant valve is closed, but not necessarily open when the hydrant valve is open.

17. The wet barrel fire hydrant of claim 14, wherein the second valve comprises:
a stem comprising an enlarged diameter portion having a diameter larger than other portions of the stem;
a spring; and
a restriction member adapted to cooperate with the stem, spring and a seat to prevent liquids or other materials from flowing in a first direction and allow liquids to flow in a second direction.

18. The wet barrel fire hydrant of claim 17, wherein the second valve further comprises an "O" ring interposed between the seat and the restriction member.

19. The wet barrel fire hydrant of claim 17, wherein the seat is a lower portion of the globe.

20. The wet barrel fire hydrant of claim 17, wherein the seat is connected to the barrel.

21. The wet barrel fire hydrant of claim 17, wherein the second valve further comprises a connection member for connecting the stem to the globe.

22. The wet barrel fire hydrant of claim 17, wherein the spring is adapted to push downward on the restriction member.

23. The wet barrel fire hydrant of claim 14,
wherein the barrel further comprises an upper barrel portion at or above the breakaway structure and a lower barrel portion at or below the breakaway structure; and
wherein the globe is located between the upper and lower barrel portions.

24. A wet barrel fire hydrant system, comprising:
a. a water conduit adapted to allow water to flow through the water conduit from a water main, the water conduit comprising a globe;
b. a barrel adapted to communicate with a water conduit, the barrel comprising a breakaway structure;
c. a nozzle extending from the barrel and communicating with the barrel;
d. a hydrant valve adapted to controllably restrict communication between the barrel and the nozzle;
e. a valve actuator adapted to allow actuation of the hydrant valve, said actuator comprising an actuator rod;
f. an operating nut in communication with the actuator rod and located on substantially opposite the nozzle for opening and closing the hydrant valve; and
g. a second valve located in the globe and adapted to be closed when the hydrant valve is closed, but to permit flow of water from the water main to the nozzle when the hydrant valve is at least partially open and the nozzle is at least partially open.

25. The wet barrel fire hydrant system of claim 24, wherein the second valve further comprises a connection member for connecting the stem to the globe.

26. The wet barrel fire hydrant system of claim 24, wherein the globe is adapted to be retrofitted into the fire hydrant.

27. A wet barrel fire hydrant system, comprising:
a water conduit adapted to allow water to flow through the water conduit;
a barrel adapted to communicate at least indirectly with the water conduit, the barrel comprising a breakaway structure;
a nozzle extending from the barrel and communicating with the barrel;
a hydrant valve adapted to controllably restrict communication between the nozzle and the barrel;
a valve actuator adapted to allow actuation of the hydrant valve, said actuator comprising an actuator rod; and
a globe comprising a second valve, the second valve comprising:
a stem comprising an enlarged diameter portion having a diameter at least larger than other portions of the stem;
a spring; and
a restriction member adapted to cooperate with the stem, spring and a seat to substantially prevent liquids from flowing toward a water main and allow liquids to flow from the water main to the nozzle.

* * * * *